United States Patent Office 3,842,116
Patented Oct. 15, 1974

3,842,116
15-HYDROXYPROST-13-ENOIC ACID DERIVATIVES
Kiyoshi Sakai, Takashi Yusa, Masaaki Sasaki, Shigeo Amemiya, Mitsuo Yamazaki, and Koichi Kojima, Tokyo, Japan, assignors to Sankyo Company Limited
No Drawing. Continuation of abandoned application Ser. No. 180,453, Sept. 14, 1971. This application Apr. 3, 1973, Ser. No. 347,577
Claims priority, application Japan, Sept. 19, 1970, 45/82,238; Sept. 28, 1970, 45/84,800
Int. Cl. C07c 61/32, 69/74
U.S. Cl. 260—468 D       5 Claims

ABSTRACT OF THE DISCLOSURE

Novel prostaglandin derivatives having the formula

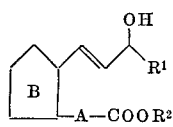

wherein A represents a straight or branched alkylene group having from 1 to 10 carbon atoms, $R^1$ represents a straight or branched alkyl group having from 1 to 10 carbon atoms, $R^2$ represents hydrogen atom or a straight or branched alkyl group having from 1 to 5 carbon atoms and the formula

represents a cyclopentylene or cyclopentenylene group selected from the formula

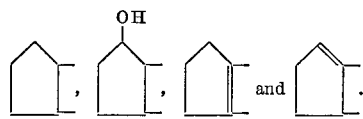

The products have pharmacological properties and are useful as inhibitors of prostaglandin dehydrogenase and uterine contraction agents and are prepared by reducing a compound having the formula

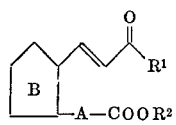

wherein A, $R^1$, $R^2$ and the formula

are as defined above.

---

This is a continuation of application Ser. No. 180,453 filed Sept. 14, 1971 now abandoned.

This invention relates to novel prostaglandin derivatives and a process for the preparation thereof.

More particularly, it relates to prostaglandin derivatives having the formula

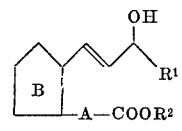     (I)

wherein A represents a straight or branched alkylene group having from 1 to 10 carbon atoms, preferably from 4 to 8 carbon atoms, $R^1$ represents a straight or branched alkyl group having from 1 to 10 carbon atoms, preferably from 3 to 7 carbon atoms, $R^2$ represents hydrogen atom or a straight or branched alkyl group having from 1 to 5 carbon atoms and the formula

represents a cyclopentylene or cyclopentenylene group selected from the formula

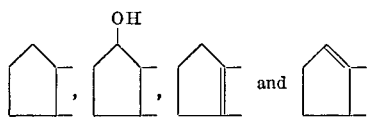

and a process for the preparation thereof.

It has been known that prostaglandins have various pharmacological activities, for example, uterine- and ileum contraction activities. However, they are rapidly inactivated in vivo by prostaglandin dehydrogenase.

As a result of earnest investigations for prostaglandins, we have unexpectedly found that the activities of prostaglandin dehydrogenase are hindered by the novel prostaglandin derivatives having the above formula (I).

For example, 50% inhibition concentration of 15-hydroxyprost-13-enoic acid and 11,15 - dihydroxyprost-13-enoic acid for 15-hydroxyprostaglandin dehydrogenase are $0.4 \times 10^{-5}$ M and $1.2 \times 10^{-5}$ M, respectively [tested by the method reported by E. Anggard and B. Sameulsson in Arkiv För Kemi, 25, 293 (1966)].

Furthermore, it has been found that the compounds having the above formula (I) in which the formula

represents

exhibit uterine contraction activity selectively. For example, termed pregnant rat uterus is contracted by 1.8 mg./kg. of 15-hydroxyprost-13-enoic acid and 6 μg./kg. of prostaglandin $E_1$, respectively (tested by the Mangus technique).

The present compounds (I) are usually administered together with known prostaglandins in a molar ratio of 200–500:1 by intravenous injection in order to prolong the activities of prostaglandins. When they are used as uterine contraction agents, the parenteral total daily dosage for termed pregnant women is of about 50–130 mg.

According to the process of the present invention by reducing a compound having the formula

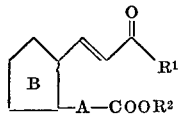
(II)

wherein A, R¹, R² and the formula

are as defined above and, if desired, hydrolyzing the reaction product.

The process of the present invention is carried out by reducing the compound (II) with an excess amount of a reducing agent in the presence of an inert solvent. As the reducing agent, there may be preferably employed a metal hydride complex, for example, sodium boron hydride, potassium boron hydride, lithium boron hydride, zinc boron hydride, tri-tert-butoxylithiumaluminum hydride and trimethoxylithium aluminum hydride.

As the solvent, there may be preferably employed an inert organic solvent such as alcohols, e.g., methanol, ethanol, tertiary butanol and ethers, e.g., tetrahydrofuran and dioxane. The reaction temperature is not critical but the reaction is carried out at a relatively lower temperature, preferably at a range of from about −10° C. to room temperature in order to prevent a side reaction. The reaction period is varied mainly depending upon the reaction temperature and a kind of the reactant. The reaction is usually completed within several hours. The reaction may be preferably carried out under an inert gas atmosphere such as a nitrogen gas or an argon gas.

After completion of the reaction, the desired product is separated from the reaction mixture by a conventional means. For instance, to the reaction mixture is at first added an organic acid such as formic acid and acetic acid to decompose the excess reducing agent and then the mixture is extracted with a water-immiscible organic solvent.

The extract is washed with water and dried and the solvent is distilled off to give the desired product. The crude product is, if necessary, further purified by a conventional means, for example, column chromatography and thin layer chromatography.

The ester compounds having the formula (I) wherein R² is an alkyl group are, if desired, hydrolyzed with a conventional means to give the carboxylic acid compounds having the formula (I) wherein R² is hydrogen atom. For instance, the ester compounds are treated with a mineral acid, for example, hydrochloric acid, hydrobromic acid and sulfuric acid or an alkali- or alkaline earth metal hydroxide, for example, sodium hydroxide, potassium hydroxide and barium hydroxide in the presence of water or aqueous alcohols, e.g., aqueous methanol and aqueous ethanol or aqueous ethers, e.g., aqueous tetrahydrofuran and aqueous dioxane.

The compounds (II) employed as starting materials are novel and prepared according to the following reaction sequence;

(1) Preparation of 15-oxoprost-13-enoic acid

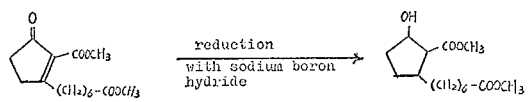

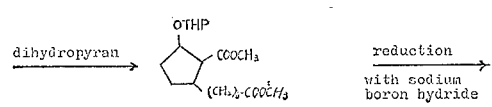

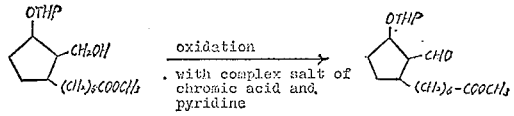

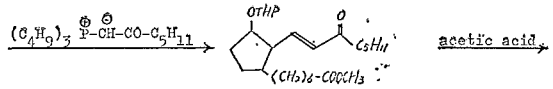

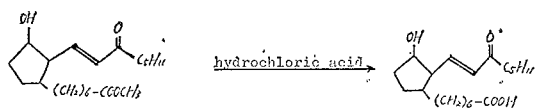

wherein THP represents 2-tetrahydropyranyl group.

(2) Preparation of 15-oxoprost-13-enoic acid, 15-oxoprost-11,13-dienoic acid and 15-oxoprost-8(12),13-dienoic acid

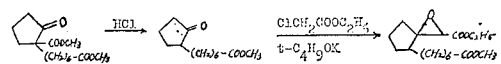

(Neth. Pat. Appln. 66,12693)

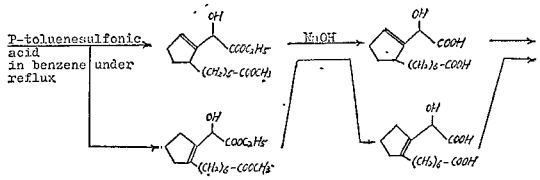

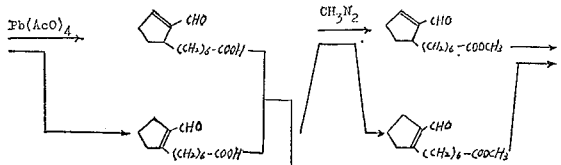

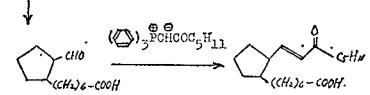

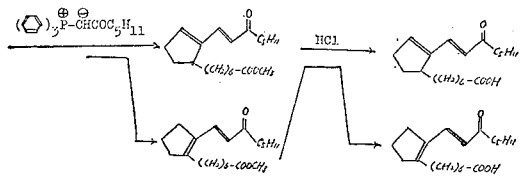

The other compounds having the formula (II) are prepared by the same procedure as described above.

The following examples are presented to further illustrate the present invention.

EXAMPLE 1

Methyl 11,15-dihydroxyprost-13-enoate

In 10 ml. of ethanol are dissolved 100 mg. of methyl 11-hydroxy-15-oxoprost13-enonate and 100 mg. of sodium boron hydride and the solution is stirred under ice cooling for one hour. After completion of the reaction, acetic acid is added to the reaction mixture in order to decompose the excess sodium boron hydride. The mixture is extracted with ether and the extract is washed with water and dried over anhydrous sodium sulfate. The solvent is distilled off. The residue is chromatographed on silica gel and eluted with benzene for a while and next benzene containing 3-7% ether successively. The eluates with the latter solvent are collected and the solvent is distilled off to give 82 mg. of the pure desired product.

I.R. (liquid film) $\nu_{max.}^{cm.^{-1}}$: 986, 1730, 3400.

N.M.R. (CDCl$_3$) $\tau$: p.p.m.

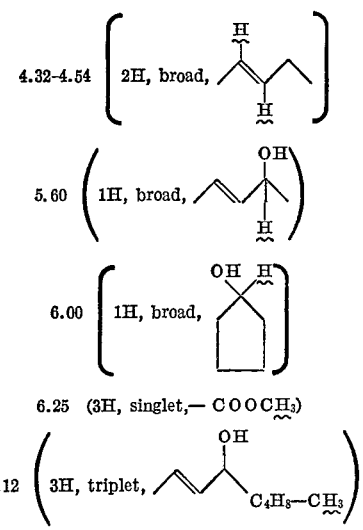

6.25 (3H, singlet,— COOCH$_3$)

9.12 (3H, triplet, ...C$_4$H$_8$—CH$_3$)

Mass spectrum M$^\oplus$—H$_2$O: 336 (C$_{21}$H$_{38}$O$_4$)

EXAMPLE 2

11,15-Dihydroxyprost-13-enoic acid 200 mg. of 11-hydroxy-15-oxoprost-13-enoic acid is dissolved in 10 ml. of ethanol and to the solution is added 100 mg. of sodium boron hydride. The mixture is stirred under ice cooling for one hour. After completion of the reaction, the reaction mixture is treated with the same procedure as in Example 1. The residue thus obtained is chromatographed on silica gel and eluted with chloroform for a while and next chloroform containing 20% ethyl acetate and ethyl acetate successively. The eluates with chloroform containing ethyl acetate and ethyl acetate are collected and the solvent is distilled off to give 142 mg. of the pure desired product.

I.R. (liquid film) $\nu_{max.}^{cm.^{-1}}$: 968, 1710, 3370.

N.M.R. (CDCl$_3$) $\tau$: p.p.m.

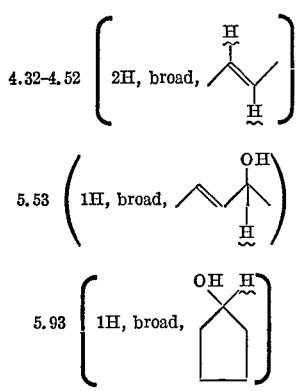

Mass spectrum M$^\oplus$—H$_2$O: 322 (C$_{20}$H$_{36}$O$_4$)

EXAMPLE 3

15-Hydroxyprost-13-enoic acid

In 5 ml. of ethanol is dissolved 310 mg. of 15-oxoprost-13-enoic acid and to the solution is added 74 mg. of sodium boron hydride under an argon atmosphere.

The mixture is stirred at room temperature for 2 hours. After completion of the reaction, acetic acid is added to the reaction mixture to decompose the excess sodium boron hydride and the mixture is poured into ice water. The mixture is extracted with ether. The extract is washed with water and dried over anhydrous sodium sulfate and the solvent is distilled off to give 350 mg. of an oily substance. The oil is chromatographed on 7 g. of silica gel and eluted with benzene for a while and next benzene containing 5% ether. The eluates with the latter solvent are collected and the solvent is distilled off to give 295 mg. of the pure desired product.

I.R. (liquid film) $\nu_{max.}^{cm.^{-1}}$: 3200-3400 (broad) 1710.

Mass spectrum M$^\oplus$: 324 (C$_{20}$H$_{36}$O$_3$)

N.M.R. (CDCl$_3$) $\delta$: p.p.m.

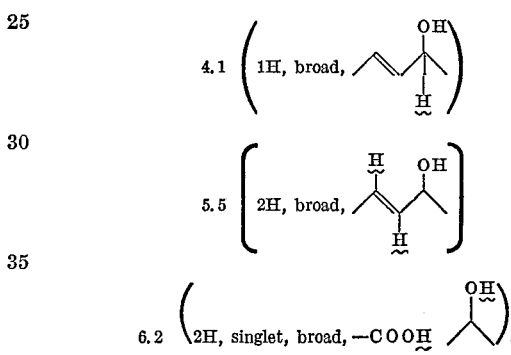

EXAMPLE 4

Methyl 15-hydroxyprost-13-enoate

In 30 ml. of ethanol is dissolved 1.32 g. of methyl 15-oxoprost-13-enoate and to the solution is added 150 mg. of sodium boron hydride under an argon atmosphere while ice cooling. The mixture is stirred for one hour. After completion of the reaction, acetic acid is added to the reaction mixture to decompose the excess sodium boron hydride and the mixture is extracted with ether. The extract is washed with water and dried over anhydrous sodium sulfate. The solvent is distilled off to give 1.33 g. of the oily desired product. The oily substance is chromatographed on 13 g. of silica gel and eluted with benzene for a while and next benzene containing 3% ether. The eluates with the latter solvent are collected and the solvent is distilled off to give 1.18 g. of the pure desired product.

I.R. (liquid film) $\nu_{max.}^{cm.^{-1}}$: 1740, 3460.

EXAMPLE 5

15-Hydroxyprost-13-enoic acid

In 30 ml. of methanol is dissolved 1.15 g. of methyl 15-hydroxyprost-13-enoate and to the solution is added dropwise 300 mg. of sodium hydroxide in 5 ml. of water. The solution is stirred at room temperature for 5 hours. After completion of the reaction, the reaction mixture is neutralized by addition of a dilute aqueous hydrochloric acid and extracted with ether. The extract is washed with water and dried over anhydrous sodium sulfate. The solvent is distilled off to give 1.10 g. of an oily substance. The oil is chromatographed on 12 g. of silica gel and eluted with benzene for a while and next benzene containing 10% ether. The eluates with the latter solvent are collected and the solvent is distilled off to give 966 mg. of the pure desired product.

I.R. (liquid film) $\nu_{max.}^{cm.^{-1}}$: 3200–3400 (broad), 1710.

Mass spectrum M⊕: 324 ($C_{20}H_{36}O_3$)

N.M.R. (CDCl₃) δ: p.p.m.

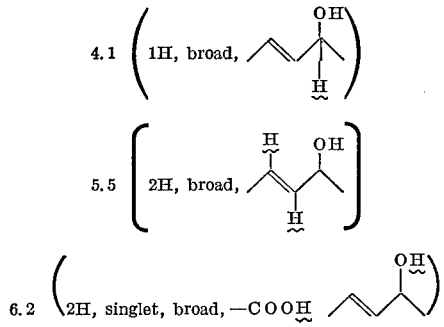

EXAMPLE 6

Methyl 15-hydroxyprost-8(12),13-dienoate

In 10 ml. of ethanol is dissolved 270 mg. of methyl 15-oxoprost-8(12),13-dienoate and to the solution is added 31 mg. of sodium boron hydride. The mixture is stirred at room temperature for 8 hours. After completion of the reaction, glacial acetic acid is added to the reaction mixture to decompose the excess sodium boron hydride. The mixture is poured into ice water and extracted with ether. The extract is washed with water and dried over anhydrous sodium sulfate. The solvent is distilled off to give 295 mg. of an oily substance. The oil is chromatographed on 3 g. of silica gel and eluted with benzene for a while and next benzene containing 2% ether. The eluates with the latter solvent are collected and the solvent is distilled off to give 260 mg. of the pure desired product.

I.R. (liquid film) $\nu_{max.}^{cm.^{-1}}$: 3490, 1750, 1650, 960.

UV $\lambda_{max.}^{Ethanol}$ 240, 248 (ε = 17,000) 257 mμ.

EXAMPLE 7

15-Hydroxyprost-8(12),13-dienoic acid

In 10 ml. of methanol is dissolved 240 mg. of methyl 15-hydroxyprost-8(12),13-dienoate and to the solution is added dropwise 50 mg. of sodium hydroxide in 1.5 ml. of water. The mixture is stirred for 8 hours at room temperature. After completion of the reaction, the reaction mixture is treated by the same procedure as in Example 5 to give 227 mg. of an oily substance. The oil is chromatographed on 5 g. of silica gel and eluted with benzene for a while and next benzene containing 5% ether. The eluates with the latter solvent are collected and the solvent is distilled off to give 186 mg. of the pure desired product.

I.R. (liquid film) $\nu_{max.}^{cm.^{-1}}$: 3400, 1720, 960.

UV $\lambda_{max.}^{Ethanol}$ 242, 248 (ε = 16,700) 255 mμ.

Mass spectrum M⊕: 322 ($C_{20}H_{34}O_3$)
N.M.R. (CDCl₃) δ: p.p.m.

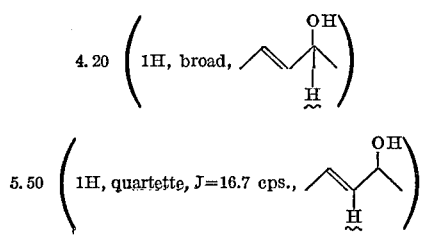

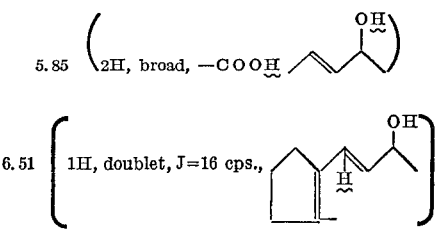

EXAMPLE 8

Methyl 15-hydroxyprost-11,13-dienoate

In 20 ml. of ethanol is dissolved 800 mg. of methyl 15-oxoprost-11,13-dienoate. To the solution is added 91 mg. of sodium boron hydride under an argon atmosphere while ice cooling and the mixture is stirred for one hour. After completion of the reaction, to the reaction mixture is added one drop of glacial acetic acid to decompose the excess sodium boron hydride and added an aqueous saturated sodium chloride solution. The mixture is extracted with ether. The extract is treated with the same procedure as in Example 4 to give 781 mg. of an oily substance. The oil is chromatographed on 10 g. of silica gel and eluted with benzene for a while and next benzene containing 5% ether. The eluates with the latter solvent are collected and the solvent is distilled off to give 559 mg. of the pure desired product.

I.R. (liquid film) $\nu_{max.}^{cm.^{-1}}$: 3450, 1740, 1650, 1600.

UV $\lambda_{max.}^{Ethanol}$ 240 mμ (ε = 15,000)

EXAMPLE 9

15-Hydroxyprost-11,13-dienoic acid

In 20 ml. of methanol is dissolved 540 mg. of methyl 15-hydroxyprost-11,13-dienoate and to the solution is added dropwise 100 mg. of sodium hydroxide in 3 ml. of water. The solution is stirred at room temperature for 15 hours. After completion of the reaction, the reaction mixture is treated with the same procedure as in Example 5 to give 502 mg. of an oily substance. The oil is chromatographed on 10 g. of silica gel and eluted with benzene for a while and next benzene containing 10% ether to give 394 mg. of the pure desired product.

I.R. (liquid film) $\nu_{max.}^{cm.^{-1}}$: 3200–3400, 1710.

UV $\lambda_{max.}^{Ethanol}$ 240 mμ (ε = 15,800)

Mass spectrum M⊕: 322 ($C_{20}H_{34}O_3$)

N.M.R. (CDCl₃) δ: p.p.m.

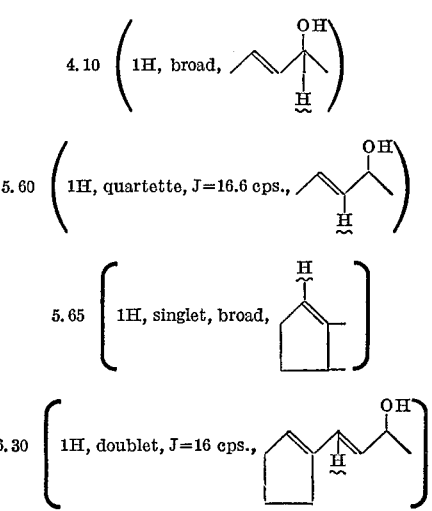

What is claimed is:
1. A compound having the formula

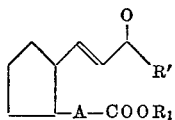

wherein A represents a straight or branched alkylene group having from 4 to 8 carbon atoms, R' represents a straight or branched alkyl group having from 3 to 7 carbon atoms, and $R^2$ represents a hydrogen atom or a straight or branched alkyl group having from 1 to 5 carbon atoms.

2. A compound of Claim 1, wherein A is

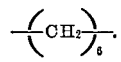

3. A compound of Claim 2, wherein R' is $-C_5H_{11}$.
4. A compound of Claim 1 comprising 15-hydroxyprost-13-enoic acid.
5. A compound of Claim 1 comprising methyl 15-hydroxyprost-13-enoate.

References Cited
UNITED STATES PATENTS
3,736,335  5/1973  Wendler et al. _____ 260—340.9

ROBERT GERSTL, Primary Examiner

U.S. Cl. X.R.

260—345.8, 348 A, 410.9 R, 413, 468 K, 514 D, 514 K; 421—305, 317